US011212958B2

(12) United States Patent
Fehr

(10) Patent No.: US 11,212,958 B2
(45) Date of Patent: Jan. 4, 2022

(54) PEANUT DIGGER-SHAKER-INVERTER

(71) Applicant: Fehr's Industrial Manufacturing, LLC, Seminole, TX (US)

(72) Inventor: John Fehr, Seminole, TX (US)

(73) Assignee: Fehr's Industrial Manufacturing, LLC, Seminole, TX (US)

( * ) Notice: Subject to any disclaimer, the term of this patent is extended or adjusted under 35 U.S.C. 154(b) by 0 days.

(21) Appl. No.: 15/946,538

(22) Filed: Apr. 5, 2018

(65) Prior Publication Data
US 2018/0295773 A1  Oct. 18, 2018

Related U.S. Application Data

(60) Provisional application No. 62/485,321, filed on Apr. 13, 2017.

(51) Int. Cl.
*A01D 29/00* (2006.01)
*A01D 25/00* (2006.01)
*A01D 33/08* (2006.01)

(52) U.S. Cl.
CPC ........... *A01D 29/00* (2013.01); *A01D 25/005* (2013.01); *A01D 33/08* (2013.01)

(58) Field of Classification Search
CPC ....... A01D 29/00; A01D 25/005; A01D 33/08
See application file for complete search history.

(56) References Cited

U.S. PATENT DOCUMENTS

| | | | | |
|---|---|---|---|---|
| 1,284,449 A | * | 11/1918 | Prior | A01D 25/048 171/61 |
| 2,311,982 A | | 2/1943 | Goodrich | |
| 2,372,586 A | * | 3/1945 | Kraus | A01D 29/00 171/7 |
| 2,528,689 A | | 11/1950 | Flynt | |
| 2,540,655 A | * | 2/1951 | Collins | A01D 29/00 171/51 |
| 2,722,794 A | | 11/1955 | McGee | |
| 2,855,058 A | * | 10/1958 | Krier | A01D 45/28 171/42 |
| 2,902,997 A | * | 9/1959 | Hawkins | A01D 29/00 460/134 |
| 2,999,547 A | | 9/1961 | Long | |
| 3,181,617 A | * | 5/1965 | Wallace | A01D 29/00 171/61 |
| 3,260,314 A | | 7/1966 | Edwards | |

(Continued)

OTHER PUBLICATIONS

"Fehrs Peanut Digger Video," Fehrs Industrial Manufacturing, LLC., https://www.youtube.com/watch?v=6jSyfzu8w58&feature=youtu.be, Oct. 11, 2016, 2 pages.

*Primary Examiner* — Thomas B Will
*Assistant Examiner* — Joel F. Mitchell

(57) ABSTRACT

A digger-shaker-inverter for harvesting root plants includes a frame and a row unit. The row unit includes a first belt driving assembly and a second belt driving assembly. The first belt driving assembly includes a first carrying belt that grips a first side of a vine and a fixed bracket that supports the first carrying belt. The second belt drive assembly include a second carrying belt that grips a second side of the vine, and an adjustable bracket that supports the second carrying belt and adjust to control a distance between the first carrying belt and the second carrying belt.

20 Claims, 13 Drawing Sheets

(56) References Cited

U.S. PATENT DOCUMENTS

| | | | |
|---|---|---|---|
| 3,496,713 A | | 2/1970 | Reinhardt et al. |
| 3,497,013 A | * | 2/1970 | Baker .................... A01D 45/26 |
| | | | 171/38 |
| 3,693,721 A | * | 9/1972 | Arnold ................. A01D 25/048 |
| | | | 171/61 |
| 3,726,345 A | | 4/1973 | Harrell et al. |
| 3,743,024 A | * | 7/1973 | Mayo ................... A01D 25/048 |
| | | | 171/25 |
| 3,989,111 A | | 11/1976 | Hobbs |
| 4,230,188 A | | 10/1980 | Paulk |
| 4,326,590 A | * | 4/1982 | Yancey ................ A01D 25/048 |
| | | | 171/61 |
| 4,470,245 A | * | 9/1984 | Agadi .................... A01D 46/08 |
| | | | 171/61 |
| 4,607,703 A | * | 8/1986 | Wang ..................... A01D 29/00 |
| | | | 171/1 |
| 4,633,955 A | | 1/1987 | Gresham |
| 5,138,826 A | | 8/1992 | Hobbs |
| 5,588,494 A | | 12/1996 | Pickett et al. |
| 6,095,253 A | | 8/2000 | Crowley |
| 9,532,501 B2 | * | 1/2017 | Francis .................. A01D 33/00 |
| 2003/0188522 A1 | * | 10/2003 | Robinson, Sr. ........ A01D 29/00 |
| | | | 56/328.1 |

* cited by examiner

PEANUT DIGGER-SHAKER-INVERTER

CROSS-REFERENCE TO RELATED APPLICATIONS

This application claims the benefit of U.S. Provisional Patent Application No. 62/485,321 filed Apr. 13, 2017, which is hereby incorporated by reference in its entirety.

TECHNICAL FIELD

The present application relates generally to farm equipment for harvesting peanuts and more particularly to a combination digger-shaker-inverter for harvesting crops such as peanuts.

BACKGROUND

Peanuts have a very small time window and intricate method for harvesting. The window for harvesting, for example, is typically four days, on average. Moreover, peanuts grow underground attached to roots of an aboveground vine. Therefore, to harvest peanuts, the plant is dug from the ground, shaken to remove as much dirt as possible, and inverted for drying in the sun (where the drying decreases the amount of force require to separate the peanut from the roots and vine).

SUMMARY OF THE DISCLOSURE

For a more complete understanding of the present disclosure and its advantages, reference is now made to the following description taken in conjunction with the accompanying drawings, in which like reference numerals represent like parts:

In a first embodiment, a row unit for a digger-shaker-inverter assembly for harvesting rooted plants is provided. The row unit includes a first belt driving assembly and a second belt driving assembly. The first belt driving assembly includes a first carrying belt that grips a first side of a vine and a fixed bracket that supports the first carrying belt. The second belt drive assembly include a second carrying belt that grips a second side of the vine, and an adjustable bracket that supports the second carrying belt and adjust to control a distance between the first carrying belt and the second carrying belt.

In another embodiment, a digger-shaker-inverter (DSI) apparatus for harvesting crops vines or stalks is provided The digger-shaker-inverter includes a frame and a row unit. The row unit includes a first belt driving assembly and a second belt driving assembly. The first belt driving assembly includes a first carrying belt that grips a first side of a vine and a fixed bracket that supports the first carrying belt. The second belt drive assembly include a second carrying belt that grips a second side of the vine, and an adjustable bracket that supports the second carrying belt and adjust to control a distance between the first carrying belt and the second carrying belt.

In yet another embodiment, a method provides for operating a digger-shaker-inverter (DSI) apparatus. The method includes adjusting an adjustable bracket of a second belt drive assembly to control a distance between a first carrying belt of a first belt drive assembly and a second carrying belt of the second belt drive assembly; gripping a vine on a first side using the first carrying belt support by a fixed bracket on the first belt drive assembly; and gipping the vine on a second side using the second carrying belt supported by the adjustable bracket.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6d, discussed below, and the various embodiments used to describe the principles of the present disclosure are by way of illustration only and should not be construed in any way to limit the scope of the invention. Those skilled in the art will understand that these principles may be implemented in any type of suitably arranged device or system.

Figure 1:
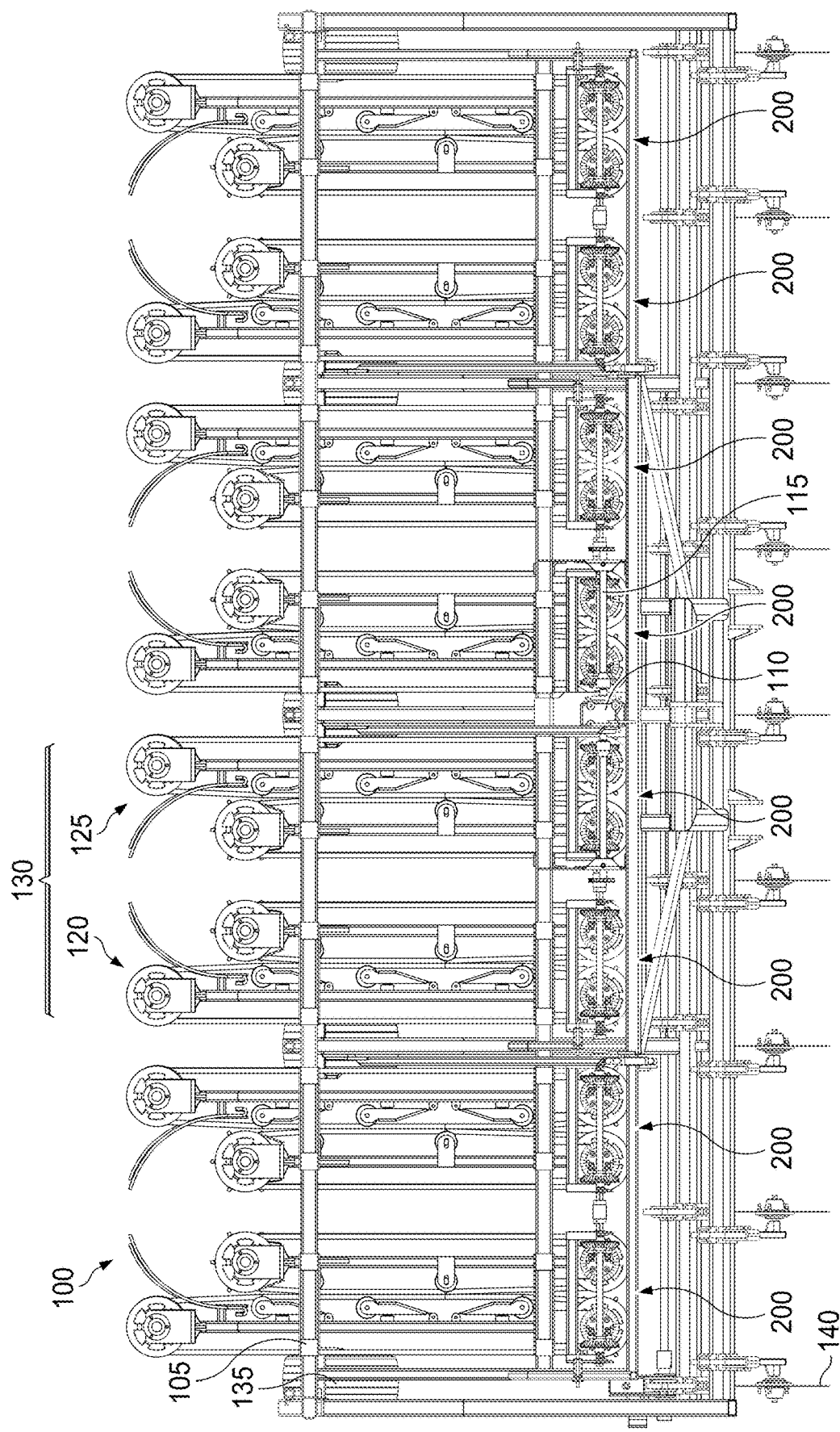
FIG. 1 is a plan view of an exemplary digger-shaker-inverter for harvesting rooted plants according to embodiments of the present disclosure.

FIG. 1 illustrates an exemplary digger-shaker-inverter (DSI) assembly 100 for harvesting rooted plants according to embodiments of the present disclosure. The rooted plants include, but are not limited to, vines or stalks of various crops such as peanuts. The embodiment of the DSI assembly 100 illustrated in FIG. 1 is for illustration only. FIG. 1 does not limit the scope of this disclosure to any particular embodiment of a DSI.

The DSI assembly 100 is pulled behind a tractor to dig vines from rooted plants, such as peanuts, shake any excess soil from the vines, and invert the vines for drying out the vines before collecting at a later point in time. The DSI assembly 100 includes a frame 105, a drive gear 110, a drive shaft 115, and a plurality of row units 200. In certain embodiments, a first row unit 120 and a complementary second row unit 125 are placed adjacent to each other to form a row unit pair 130, which can merge two rows of vines. A plurality of tires 135 can be attached to the frame 105 to support the DSI assembly 100. A plurality of cutting discs 140 can be attached to the front of the frame 105 to loosen the soil in front of the plants to be harvested.

The frame 105 provides the support and positioning of the other components included in the DSI assembly 100. The frame 105 is illustrated to support four row unit pairs 130 comprising eight row units 200 in total, but the frame 105 can be widened or narrowed to support a suitable amount of row units.

In the illustrated embodiment of FIG. 1, the drive gear 110 is mounted on the frame 105. The drive gear 110 can be mounted at a center of the drive shaft 115 or at one of the ends of the drive shaft 115. The DSI assembly 100 can include more than one drive gear 110. The drive gear 110 provides the rotating force or torque to rotate the carrying belts. The drive gear 110 may be operatively attached to a power take off (P.T.O.) of the tractor (not shown) to receive torque from the prime mover of the tractor. In other embodiments, a different mechanism can supply torque to the drive gear 110.

The drive shaft 115 is mounted on the frame 105 at an end of the row unit 200. In the illustrated embodiment, the drive shaft 115 comprises a plurality of individual drive shafts, each of which is mounted on a respective row unit 200 and connected together by universal joints 116. The drive shaft 115 is driven or rotated by the drive gear 110. The drive shaft 115 is operatively connected to drive mechanisms mounted on each row unit 200. In the illustrated embodiment, the drive mechanisms include clutch sprockets on each row unit 200. The drive shaft 115 distributes the rotating force or torque from the drive gear 110 to each of the respective clutch sprockets.

The first row unit 120 and the second row unit 125 of a row unit pair 130 are mounted adjacently on the frame 105. The components of the two complementary row units 120, 125 forming a row unit pair 130 may be configured in a mirror image arrangement. For example, the fingers 270 of the first row unit 120 and the fingers of the second row unit 125 can be curved towards each other to both invert and merge rows of vines for collection. Unless otherwise noted, the structure and operation of each of the complementary row units 120, 125 is substantially identical (except for the mirror image arrangement), and thus are the row units are generally described herein as row units 200.

Figure 2A:
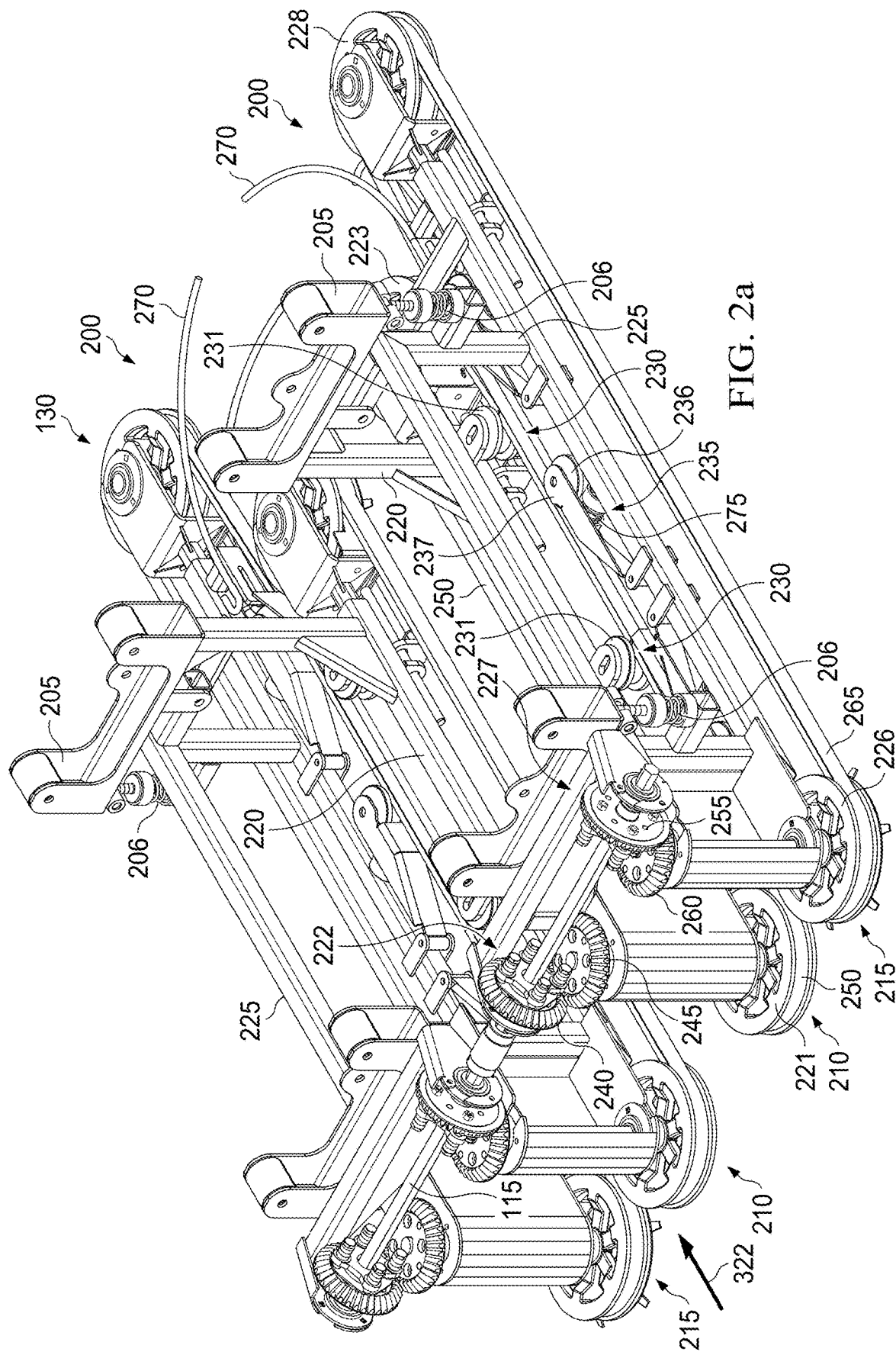
FIGS. 2a and 2b are, respectively, a perspective view and a plan view of an exemplary row unit pair for the digger-shaker-inverter according to embodiments of the present disclosure.
Figure 2B:
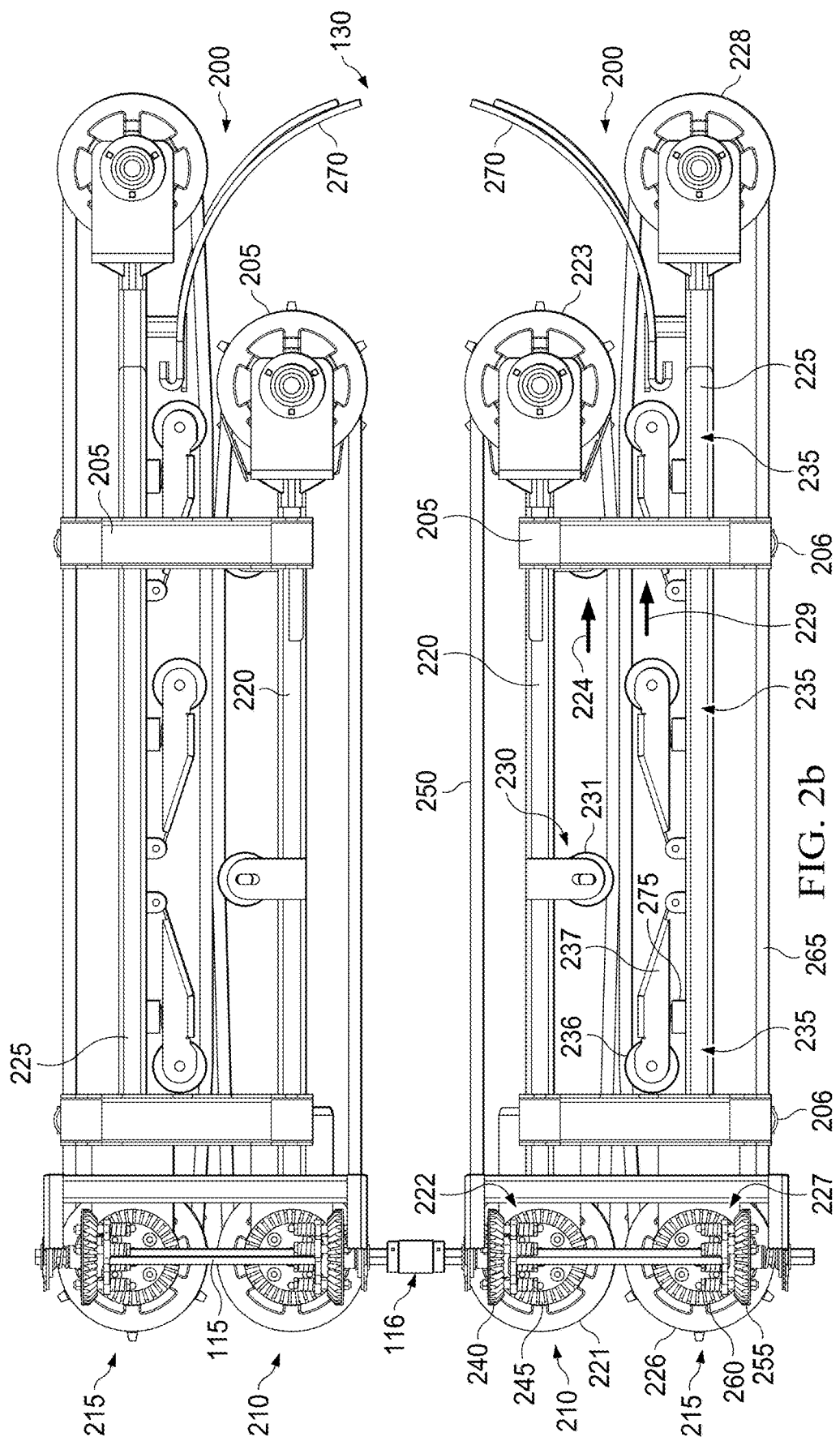

FIGS. 2a and 2b illustrate an exemplary row unit pair 130 having two complementary row units 200 for the DSI assembly 100 according to embodiments of the present disclosure. The embodiments of the row unit pair 130 and the row units 200 illustrated in FIGS. 2a and 2b are for illustration only. FIGS. 2a and 2b do not limit the scope of this disclosure to any particular embodiment of a DSI.

The row unit 200 includes a row unit frame 205, a first belt drive assembly 210, a second belt drive assembly 215, and a set of fingers 270. The row unit 200 grabs the vine, shakes the vine, and inverts the vine.

The row unit frame 205 is connectable to the DSI frame 105 to support the first belt drive assembly 210 and the second belt drive assembly 215. The row unit frame 205 includes a fixed bracket 220 and an adjustable bracket 225. The fixed bracket 220 is connected to the first belt drive assembly 210. The fixed bracket 220 includes a plurality of idlers 230. The adjustable bracket 225 is connected to the second belt drive assembly 215. The second belt drive assembly 215 includes a plurality of tensioners 235.

The fixed bracket 220 can be rigidly mounted to the frame 205. The adjustable bracket 225 can be hingedly mounted to the frame 205 to swing relative to the fixed bracket 220 to move the second belt drive assembly 215 closer and farther from the first belt drive assembly 210. The adjustable bracket 225 can be biased using springs 206 to move the second belt drive assembly 215 closer to the first belt drive assembly 210. In some embodiments, the position of the adjustable bracket 225 can be selectively set to fix the spacing between the second belt drive assembly 215 and the first belt drive assembly 210 to a desired distance. In other embodiments, the adjustable bracket 225 can be selectively set to fix the minimum spacing between the second belt drive assembly 215 and the first belt drive assembly 210 to a desired distance (but to allow a greater distance if the bias of the springs 206 is overcome). In other embodiments, the adjustable bracket 225 can be selectively set to fix the maximum spacing between the second belt drive assembly 215 and the first belt drive assembly 210 to a desired distance. The minimum distance can be set to a distance less than the thinnest vine to be harvested to ensure that all vines are gripped. The maximum distance can be set to a distance greater than the thickest vine to be harvested when the springs are fully compressed. The maximum distance would provide the ability to grip the largest vines.

The first belt drive assembly 210 includes the fixed bracket 220, a first front pulley 221, a first drive mechanism 222, a first back pulley 223 and a first carrying belt 250. The first front pulley 221 and first back pulley 223 are each rotatably mounted on respective ends of the fixed bracket 220. The first drive mechanism 222 is operatively connected between the drive shaft 115 and the first front pulley 221 to rotate the first front pulley in a first rotational direction when the drive shaft is rotating in a driving direction. The carrying belt 250 is an endless belt configured in a loop 325 and operatively mounted around the first front pulley 221 and the first back pulley 223. When the drive shaft 115 rotates in the driving direction, the carrying belt 250 travels (as denoted by arrow 224) from the first front pulley 221 to the first back pulley 223 on a retreating side 326 of the first loop 325.

The fixed bracket 220 supports the plurality of idlers 230. The fixed bracket 220 aligns the plurality of idlers 230 in fixed positions to provide the support on the first carrying belt 250 to grab, shake, and invert the vines.

In some embodiments, the idlers 230 are provided on the fixed bracket 220. The idlers 230 put tension on the first carrying belt 250. The idlers 230 can be evenly spaced or grouped in pairs. The idlers 230 include rollers 231 to allow the first carrying belt 250 to rotate around the first belt drive assembly 210.

In other embodiments, the plurality of idlers 230 are mounted to the fixed bracket 220 and disposed within the first loop 325 adjacent to the first carrying belt 250 along the retreating side 326. Each of the idlers 230 is configured to support or bias the first carrying belt 250 against bending toward the interior of the first loop 325. If the first carrying belt 250 is made of a flexible material, then each of the idlers 230 supports or biases a respective local region 340 of the first carrying belt 250 against bending toward the interior of the first loop 325. Each respective local region 340 is a span of the carrying belt (in this case first carrying belt 250) centered on the idler 230 and extending on either side of the idler across a span distance, wherein the value of the span distance is inversely proportional to the flexibility of the material comprising the carrying belt. In other words, the span distance of the local regions 340 increases as the material of the carrying belt 250 becomes less flexible, and the span distance decreases as the material of the carrying belt becomes more flexible. In the illustrated embodiment, the plurality of idlers 230 includes rollers 231, each of which is rotatably mounted to a respective fixed extension of the fixed bracket 220.

The first drive mechanism 222 receives torque from the rotating drive shaft 115 and uses the torque to rotate the first front pulley 221. The first drive mechanism 222 may also serve to change the axis of rotation so that the first front pulley 221 rotates about a different axis from the drive shaft 115. The first drive mechanism 222 may also serve as a clutch to allow rotational slippage between the drive shaft 115 and the first front pulley 221 under predetermined conditions. In one embodiment, the first drive mechanism 222 can have a slipping clutch, for example to limit the amount of torque transmitted to a predetermined value. In the illustrated embodiment, the first drive mechanism 222 includes a first clutch sprocket 240 and a first horizontal sprocket 245.

The second belt drive assembly 215 includes the adjustable bracket 225, a second front pulley 226, a second drive mechanism 227, a second back pulley 228 and a second carrying belt 265. The second front pulley 226 and second back pulley 228 are each rotatably mounted on respective ends of the adjustable bracket 225. The second carrying belt 265 is an endless belt configured in a second loop 330 and operatively mounted around the second front pulley 226 and the second back pulley 228. The second drive mechanism 227 is operatively connected between the drive shaft 115 and the second front pulley 226 to rotate the second front pulley in a second rotational direction when the drive shaft is rotating in a driving direction. The second rotational direction is the opposite of the first rotational direction of the first front pulley 221. When the drive shaft 115 rotates in the driving direction, the second carrying belt 265 travels (as denoted by arrow 229) from the second front pulley 226 to the second back pulley 228 on a retreating side 331 of the second loop 330. Thus, during operation of the DSI assembly 100, the retreating sides 326, 331 of the respective belt drive assemblies 210, 215 are positioned adjacent to one another and travel in the same direction to pinch and carry the vines therebetween.

The adjustable bracket 225 supports the plurality of tensioners 235. The adjustable bracket 225 is adjustable by rotating the second carrying belt 265 a distance from the first carrying belt 250. The distance is based on the thickness of the vines to be harvested.

In some embodiments, the tensioners 235 are provided on the adjustable bracket 225. The tensioners 235 put tension on the second carrying belt 265 using a spring 275. The tensioners 235 can by evenly spaced or grouped in pairs. The tensioners 235 can align with the idlers 230 or be alternatively spaced with the idlers 230 along the length of the row units 200. The tensioners 235 are spring loaded to keep the second carrying belt 265 close to the first carrying belt 250. For example, when a vine is being conveyed, the grip of the belts is dependent on the thickness of the vine. The grip of the vine between the first carrying belt 250 and the second carrying belt 265 is explained in more detail in relation to FIGS. 3a-3e.

In other embodiments, the plurality of tensioners 235 are mounted to the adjustable bracket 225 and disposed within the second loop 330 adjacent to the second carrying belt 265 along the retreating side 331. Each of the tensioners 235 is configured to bias the second carrying belt 265 against bending toward the interior of the second loop 330. If the second carrying belt 265 is made of a flexible material, then each of the tensioners 235 biases a respective local region 340 of the second carrying belt against bending toward the interior of the second loop 330. As previously described, each respective local region 340 is a span of the carrying belt (in this case, second carrying belt 265) centered on the tensioner 235 and extending on either side of the tensioner across a span distance, wherein the value of the span distance is inversely proportional to the flexibility of the material comprising the carrying belt. In the illustrated embodiment, each of the plurality of tensioners 235 includes a link 237 having a first end hingedly mounted to the adjustable bracket 225, a roller 236 rotatably mounted to a second end of the link and the spring 275 mounted between the adjustable bracket and the link to bias the roller toward the retreating side 331 of the second loop 330.

In some embodiments, the idlers 230 and tensioners 235 are disposed at different points along the gripping path 322 (i.e. adjacent to the retreating sides 326, 331 of the respective carrying belts 250, 265) such that respective local regions 340 of support/biasing are distributed along the gripping path. Put another way, each idlers 230 and tensioners 235 can be disposed along gripping path 322 such that no other idler or tensioner is disposed directly across the gripping path therefrom. In some embodiments, the idlers 230 and tensioners 235 are disposed along the gripping path 322 in an alternating arrangement. For example, in the illustrated embodiment, each subsequent one of the idler rollers 231 and tensioner rollers 236 along the gripping path 322 is disposed on an opposite side of the gripping path from a previous one of the idler rollers and tensioner rollers.

The second drive mechanism 227 receives torque from the rotating drive shaft 115 and uses the torque to rotate the second front pulley 226. The second drive mechanism 227 may also serve to change the axis of rotation so that the second front pulley 226 rotates about a different axis from the drive shaft 115. The second drive mechanism 227 may also serve as a clutch to allow rotational slippage between the drive shaft 115 and the second front pulley 226 under predetermined conditions. In one embodiment, the second drive mechanism 227 can have a slipping clutch, for example to limit the amount of torque transmitted to a predetermined value. In the illustrated embodiment, the second drive mechanism 227 includes a second clutch sprocket 255 and a second horizontal sprocket 260.

Referring still to FIGS. 2a and 2b, in the illustrated embodiment the first and second drive mechanisms 222, 227 each comprise respective clutch sprockets 240, 255 engaging respective horizontal sprockets 245, 260. The first clutch sprocket 240 and the second clutch sprocket 255 are mounted on the drive shaft 115. The first clutch sprocket 240 and the second clutch sprocket 255 rotate about the drive shaft 115. The first clutch sprocket 240 includes gear teeth that align with the gear teeth of the first horizontal sprocket 245. The second clutch sprocket 255 includes gear teeth that align with the gear teeth of the second horizontal sprocket 260. The gear teeth of the first clutch sprocket 240 and the second clutch sprocket 255 allow slippage between the matching horizontal sprockets 245 and 260. The first clutch sprocket 240 and the first horizontal sprocket 245 translate a rotation around a horizontal axis to a rotation around a vertical axis. The second clutch sprocket 255 and the second horizontal sprocket 260 translate a rotation around a horizontal axis to a rotation around a vertical axis.

Figure 4C:
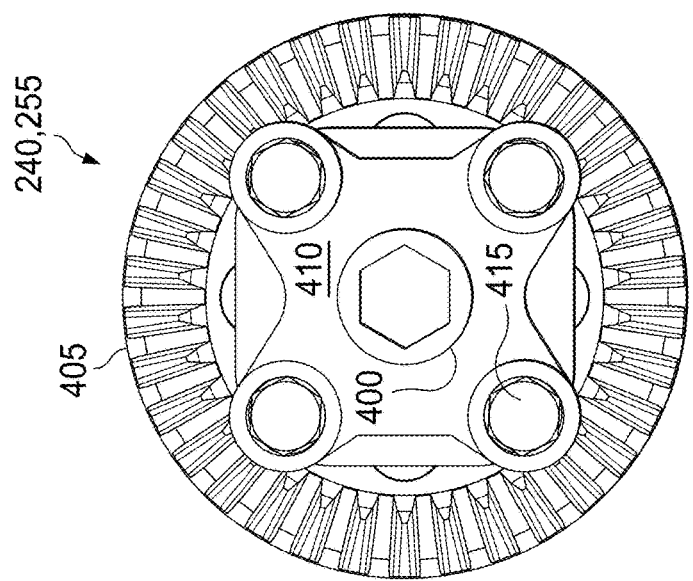
FIGS. 4a, 4b and 4c are, respectively, front, side and back elevation views of a slipping clutch mechanism according to embodiments of the present disclosure.
Figure 4B:
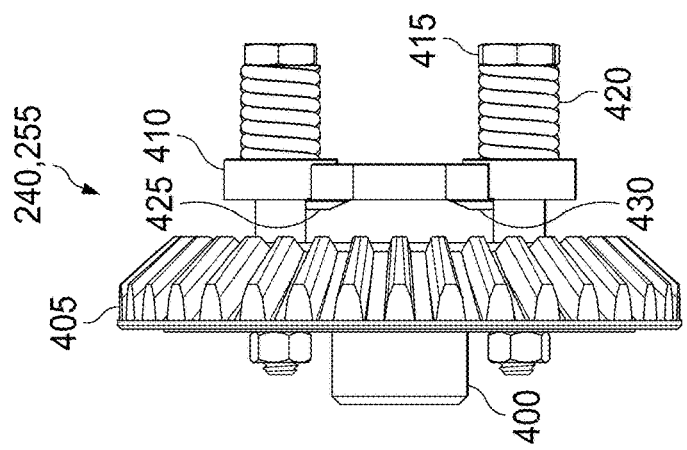
Figure 4A:
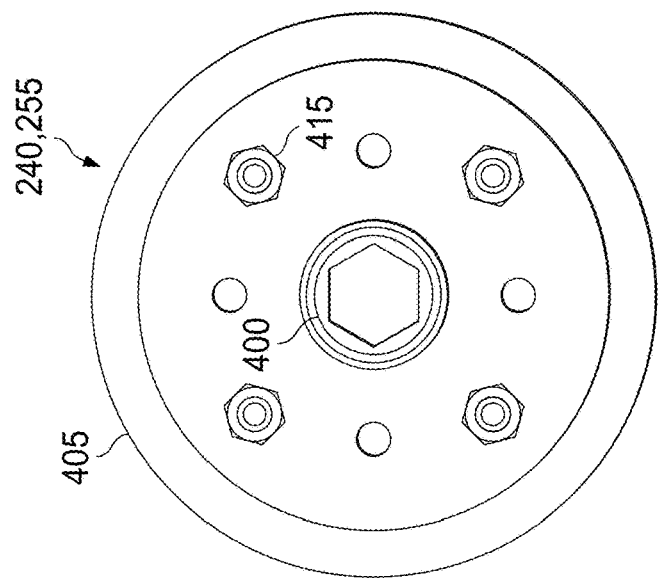

Referring still to FIGS. 2a and 2b, but now also to FIGS. 4a, 4b and 4c, in the illustrated embodiment, each clutch sprocket 240, 255 further comprises a respective clutch hub 400, gear wheel 405, drive plate 410, a plurality of connectors 415 and a corresponding plurality of springs 420. The clutch hub 400 is mounted on the drive shaft 115 and is configured to engage the drive shaft so as to always rotate with the drive shaft. In the illustrated embodiment, the clutch hub 400 has a hexagonal internal through-hole that engages a corresponding hexagonal exterior cross-section of the drive shaft 115. The gear wheel 405 is rotatably mounted over the clutch hub 400 (i.e., the gear wheel does not rotatably engage the clutch hub, but instead can freely rotate). The clutch drive plate 410 is slidably connected to the gear wheel 405 (i.e., to move along the longitudinal axis of the drive shaft 115) using the plurality of connectors 415. The clutch drive plate 410 is biased toward the gear wheel 405 and the clutch hub 400 by the clutch springs 420 mounted on each connector 415.

The clutch drive plate 410 has a contoured center portion 425 that is configured to engage a contoured head 430 of the clutch hub 400. The contoured portions 425 and 430 are configured to transmit torque from the clutch hub 400 to the clutch drive plate 410 (and hence to the attached gear wheel 405) when the torque presented between the clutch hub and clutch drive plate is equal to or below a predetermined value, and to overcomes the bias of the springs 420 and move out of engagement with one another when the torque being presented exceeds the predetermined value, thereby allowing the clutch hub to continue rotating with the drive shaft 115 while the gear wheel 405 does not rotate with the drive shaft. Thus clutch sprockets 240, 255 allow the respective gear wheels 405 to rotatably slip relative to the drive shaft 115 while maintaining engagement with the respective horizontal sprockets 245, 260.

As previously described, the first carrying belt 250 rotates about the first belt drive assembly 210. The second carrying belt 265 rotates about the second belt drive assembly 215. The first horizontal sprocket 245 rotates the first carrying belt 250 and the second horizontal sprocket 260 rotates the second carrying belt 265.

As further previously described, each row unit 200 can include a finger 270 extending from the back of the row unit across the gripper path 322 (or an extension thereof) to grab or reposition the vine as it exits the drive belt assemblies, shake the vine, and inverts the vine. In some embodiments, the fingers 270 are configured to extend from the frame 105 on a path directed rearward and crossing a rearward extension of the gripping path 322. In the illustrated embodiment, two fingers 270 are provided on each row unit 200. In some embodiments, a first finger 270 is directed above an extension of the gripping path 322 and a second finger is directed below the extension of the gripping path.

As best seen in FIGS. 2a and 2b, in the illustrated embodiment of the row unit pair 130 (comprising complementary row units 120 and 125), the respective fingers 270 of each row unit can be configured to extend towards the fingers of the other row unit, such that the vines exiting from the respective gripping paths 322 of both row units are repositioned into a merged line disposed between the row units.

Figure 3A:
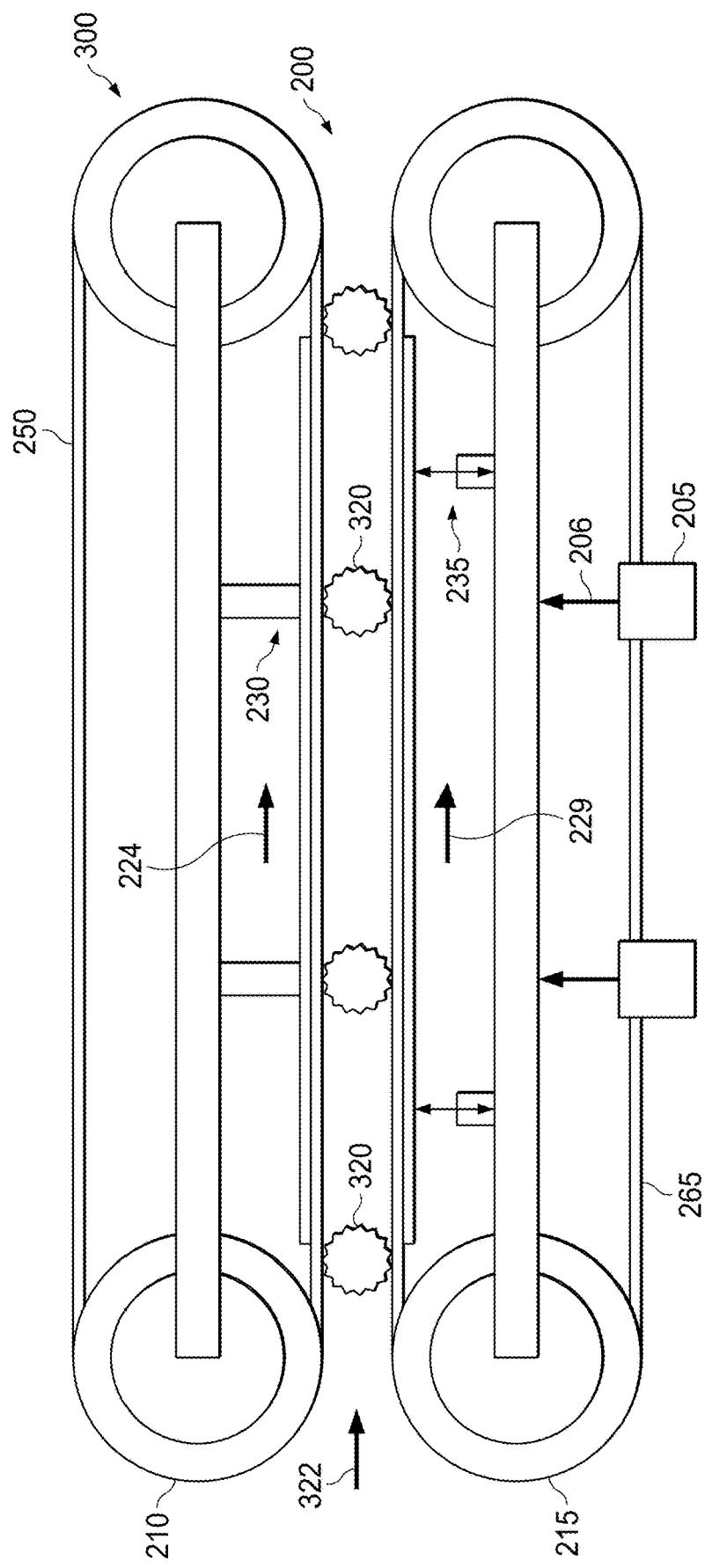
FIGS. 3a, 3b and 3c are schematic diagrams of an exemplary row unit illustrating conveying of vines using a first carrying belt and a second carrying belt structured with rigid materials for the belts or rigid support according to the embodiments of the present disclosure.
Figure 3B:
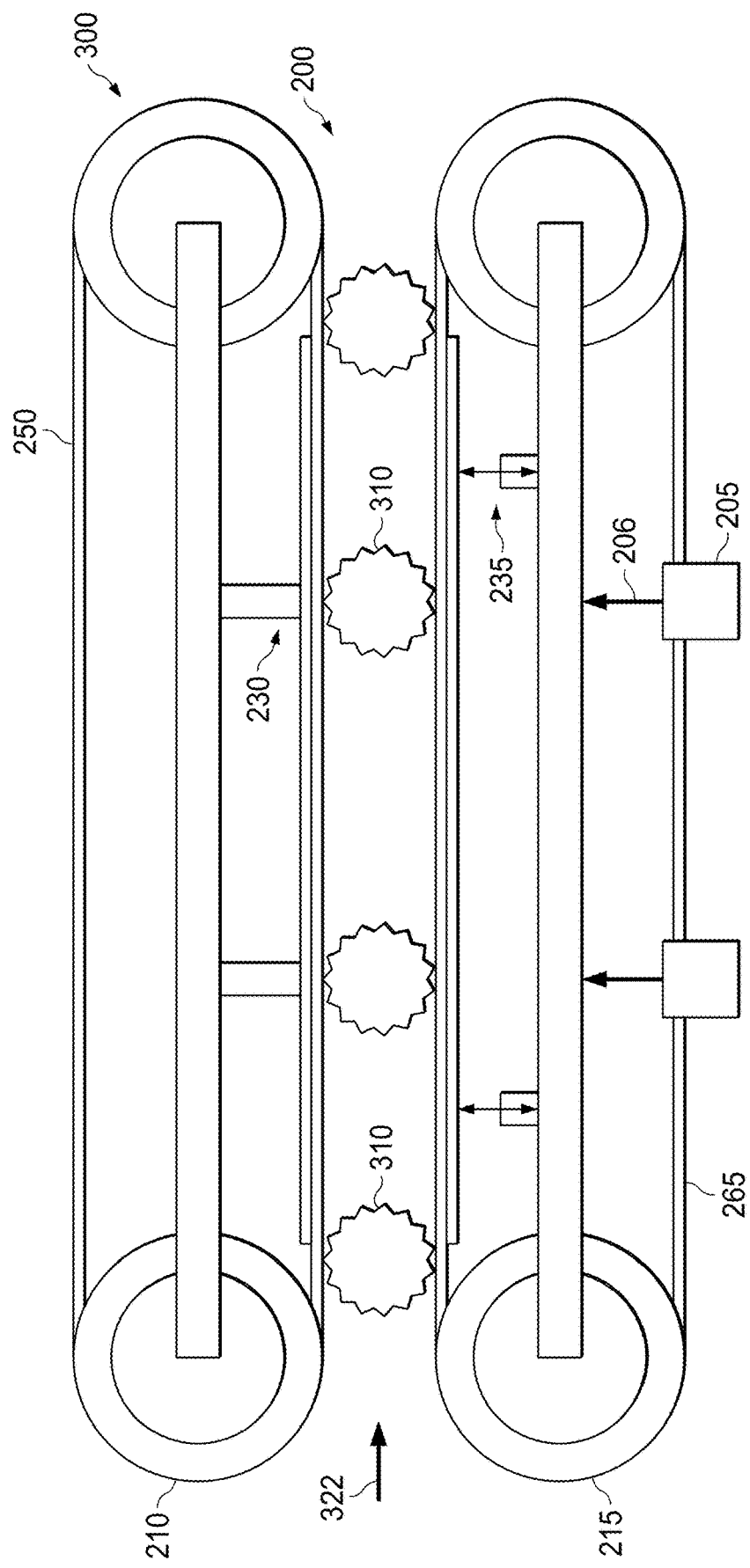
Figure 3C:
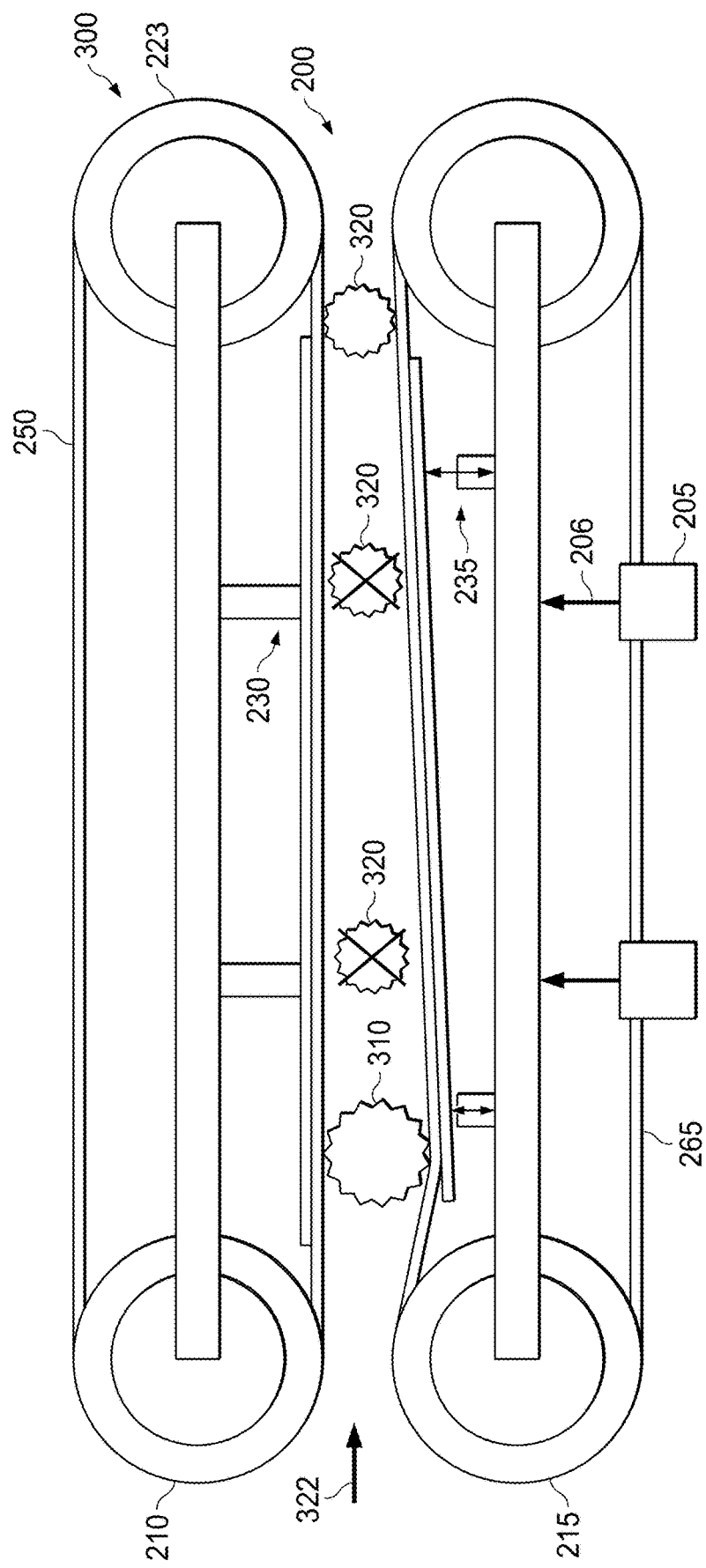
Figure 3D:
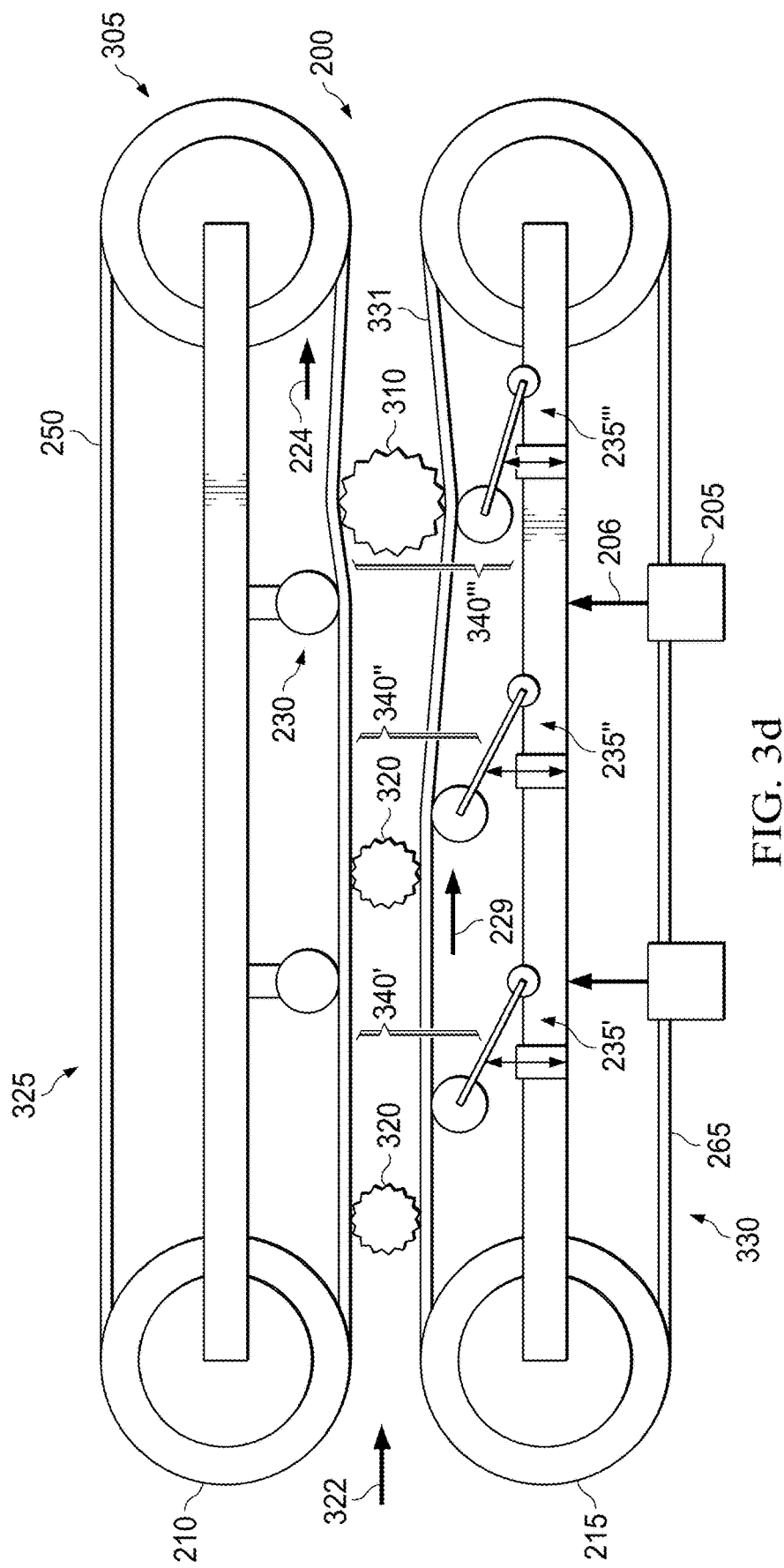
FIGS. 3d and 3e are schematic diagrams of another exemplary row unit illustrating conveying of vines using a first carrying belt and a second carrying belt structured with flexible materials for the belts or flexible support according to further embodiments of the present disclosure.
Figure 3E:
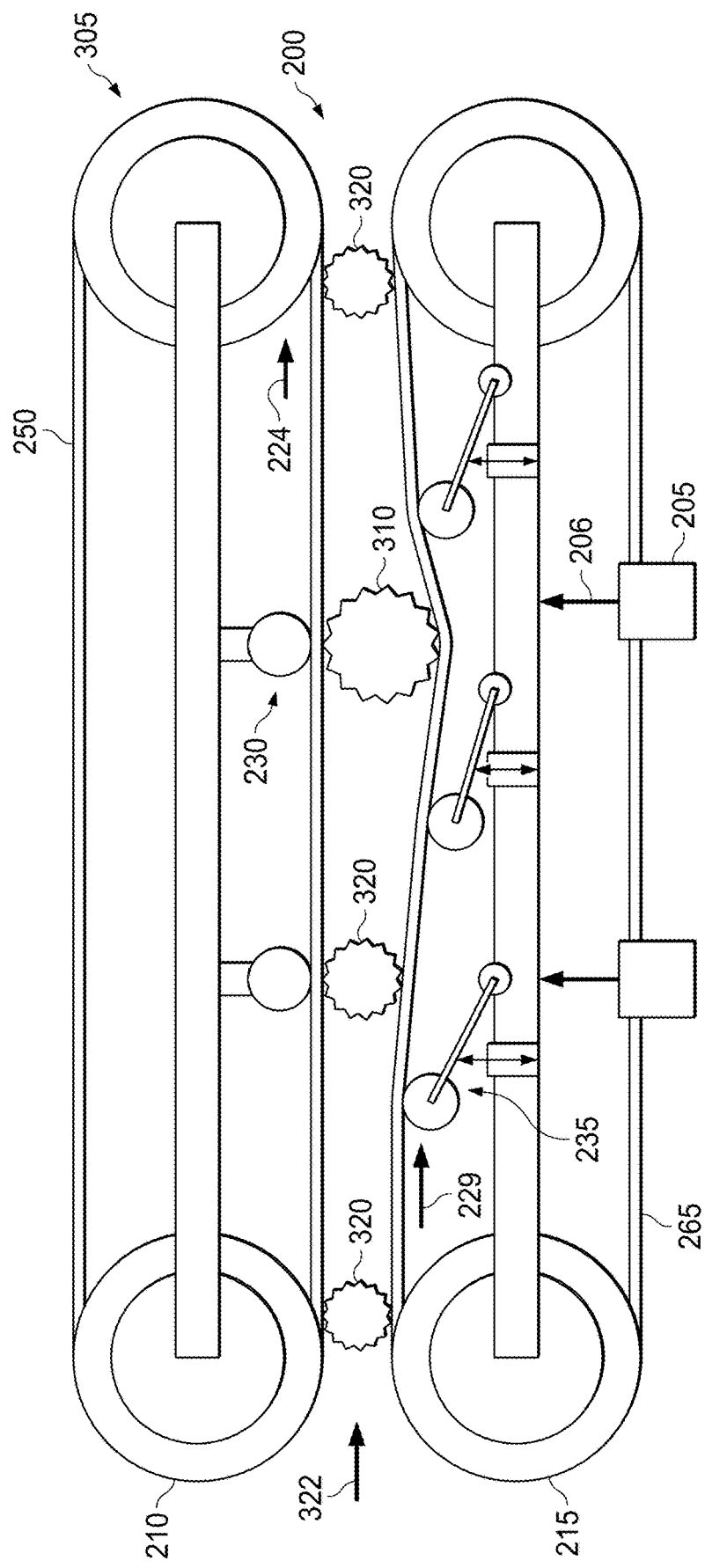

FIGS. 3a, 3b and 3c illustrate an exemplary conveying 300 of large vines 310 and small vines 320 along a gripping path 322 between a first carrying belt 250 and a second carrying belt 265 structured with rigid materials for the belts and/or with rigid support for the belts according to the embodiments of the present disclosure. FIGS. 3d and 3e illustrate an exemplary conveying 305 of large vines 310 and small vines 320 along the gripping path 322 using a first carrying belt 250 and a second carrying belt 265 structured with flexible materials for the belts and/or with flexible support for the belts according to the embodiments of the present disclosure. For purposes of this disclosure, rigid support for the belt is support that does not allow deflection or bending of the belt toward the interior of the loop in local regions along the gripping path and flexible support for the belt is support that allows deflection or bending of the belt in local regions along the gripping path. The embodiments of the conveying 300 illustrated in FIGS. 3a, 3b and 3c and the conveying 305 illustrated in FIGS. 3d and 3e are for illustration only. It will be understood that the relative size of the vines 310, 320 and the bending of the belts 250, 265 are not necessarily to scale and may be exaggerated for purposes of illustration. FIGS. 3a-3e do not limit the scope of this disclosure to any particular embodiment of a DSI.

In FIGS. 3a-3e large vines 310 and small vines 320 are being conveyed in row units 200 including a first belt drive assembly 210 and second belt drive assembly 215. As illustrated, the idlers 230 are static and provide a mostly flat surface for the vines 310, 320. The tensioners 235 are spring-loaded to put an inward force on the second carry belt 265. The adjustable bracket of the second belt drive assembly 215 can also be biased toward the first belt drive assembly 210 by springs 206 acting against the row unit frame 205.

Referring first to FIG. 3a, wherein the first carrying belt 250 and the second carrying belt 265 are made using a rigid material, such as a chain. Alternately, the carrying belts 250, 265 have rigid support, such as a continuous rail, connected to the idlers and/or tensioners. When the row unit 200 receives a series of small vines 320 along the gripper path 322, the vines are compressed under the force of the tensioners 235 and bias of the springs 206. Because the small vines 320 are substantially uniform in diameter, the spring bias of the tensioners 235 and springs 206 of the row unit 200 adjust the gap along the gripper path 322 to sufficiently grip all of the vines even though the second carrying belt 265 is rigid or rigidly supported.

Referring now to FIG. 3b, the row unit 200 (still with first and second carrying belts 250, 265 made using a rigid material or rigidly supported) receives a series of large vines 310 along the gripper path 322. As with the case of FIG. 3a, the large vines 310 are compressed under the force of the tensioners 235 and bias of the springs 206, which adjust the gap along the gripper path 322 to accommodate the larger diameter of the large vines. Because the large vines 310 are substantially uniform in diameter, the row unit 200 can sufficiently grip the vines even though the second carrying belt 265 is rigid or rigidly supported.

Referring now to FIG. 3c, the row unit 200 (still with first and second carrying belts 250, 265 made using a rigid material or rigidly supported) receives a mixture of large vines 310 and small vines 320 along the gripper path 322. Unlike the cases of FIGS. 3a and 3b, in the case of FIG. 3c the force of the tensioners 235 and bias of the springs 206 cannot adjust the gap to sufficiently grip all of the small vines 320 when a large vine 310 enters the gripper path because the carrying belts 250, 265 made using a rigid material or rigidly supported cannot locally adjust the gap where needed to grip intervening small vines 320 (denoted with "X" in FIG. 3c) located between large vines 310 or between a large vine and a small vine. The lack of sufficient grip causes the small vines 320 (denoted with "X") to not be pulled from the ground or to drop before reaching the end of the gripper path 322 without inverting and outside of the merged lane of inverted vines, which causes a loss of the vine when collecting at a later point or causes the human operator to make a short pass or stop to manually collect. Also when using a rigid material, large vines 310 would still create a significant gap between the first carrying belt 250 and the second carrying belt 265.

Referring now to FIGS. 3d and 3e, wherein the second carrying belt 265 is made using a flexible material, such as rubber or other elastomer. In some embodiments, the first carrying belt 250 is made using a flexible material, and in still other embodiments, both carrying belts 250, 265 are made using a flexible material. The first carrying belts 250 can be flexibly supported by the idlers 230 and/or the second carrying belts 265 can be flexibly supported by the tensioners 235 to allow bending in local regions 340. Each idler 230 may support the first carrying belt 250 independently of the other idlers. Each tensioner 235 may support the second carrying belt 265 independently of the other tensioners. The flexible material allows the tensioners to press the second carrying belt 265 enough to put a force and grip the small vine 320. When the vines 310, 320 of different sizes are conveyed along the gripper path 322, the springs 275 in the tensioners 235 are compressed allowing the vines to pass through the row unit 200. The tensioners 235 each include at least one spring 275 to operate individually. That is a first tensioner 235 can have a spring 275 that is fully compressed, while a second tensioner has a spring that is fully expanded.

Referring still to FIGS. 3d and 3e, when the second carrying belt 265 is made of a flexible material and flexibly supported, each of the tensioners 235 supports and biases a respective local region 340 of the second carrying belt against bending toward the interior of the second loop 330. The local regions 340 can be independently supported and biased by the various tensioners 235, which each have a spring 275 that can be compressed different amounts to grip vines of different size. If the first carrying belt 250 is made of a flexible material and flexibly supported, each of the idlers 230 supports a respective local region 340 of the first carrying belt against bending toward the interior of the first loop 325. The local regions 340 can be independently supported by the various idlers 230. For example, in FIG. 3d, the second carrying belt 265 is not significantly bent or flexed in first local region 340' and second local region 340" (denoted, respectively, by brackets centered on tensioners 235' and 235") where gripping small vines 320, but is significantly flexed or bent in a third local region 340"' (denoted by a bracket centered on a third tensioner 235"') where gripping a large vine 310. The individual springs 275 in each tensioners 235 allow independent movement of the tensioners, thus in local region 340' the tensioner 235' deflects much more when gripping an adjacent large vine 310 than the other tensioners 235', 235" in respective local regions 340', 340" gripping adjacent small vines 320. Thus, the row unit 200 can maintain sufficient gripping on both large vines 310 and small vines 320 at the same time, including small vines intervening between two large vines or between a large and small vine. In the example of FIG. 3d, the first carrying belt 250 also flexes inward across from the local region 340' when gripping the large vine 310 because there is no idler 230 in this region. Such flexing of the carrying belts 250, 265 on both sides of the gripper path 322 allows the row unit 200 to better accommodate vines 310, 320 of various sizes.

Referring now also to FIG. 3e, in this example there is no flexing of the first carrying belt 250. This situation can occur in embodiments wherein the first carrying belt 250 is made of a rigid material or is rigidly supported. Alternatively, this situation can occur in embodiments wherein the first carrying belt 250 is made of a flexible material or is flexibly supported, but when the vines 310, 320 are directly adjacent the idlers 230, which support the carrying belt against inward movement. As seen in FIG. 3e, the row unit 200 having a second carrying belt 265 made of a flexible material or flexibly supported by tensioners 235 can still flex independently in the local regions centered on each tensioner to sufficiently grip both large and small vines 310, 320, including small vines intervening between two large vines or between a large and small vine. The springs 275 in the various tensioners 235 can be compressed different amounts as necessary to grip different sized vines 310, 320.

As previously described, the first carrying belt 250 and second carrying belt 265 can be made using different materials. For example, the first carrying belt 250 could be made with a rigid material or while the second carrying belt 265 is made with a flexible material, or vice versa. In another example, the first carrying belt 250 could be rigidly supported while the second carrying belt 265 is flexibly supported to independently bend in local regions, or vice versa. In other embodiments, one or both of the carrying belts 250, 265 are flexible V-belts, in which case the respective front pulleys 221, 226 and back pulleys 223, 228 can be V-belt pulleys. The carrying belts 250, 265 made of a flexible material can be configured with a textured outer surface to grip the vines 310, 320. For example, a textured outer surface can include, but is not limited to, one or more treads, grooves, protrusions, fingers, and patterns or combinations thereof defined on the outer surface of the carrying belt 250 and/or 265.

In still other embodiments, one or both of the carrying belts 250, 265 are made using metal chain, for such as steel roller chain, and flexibly supported to independently bend in local regions, in which case the respective front pulleys 221, 226 and back pulleys 223, 228 can be sprockets.

Figure 5A:
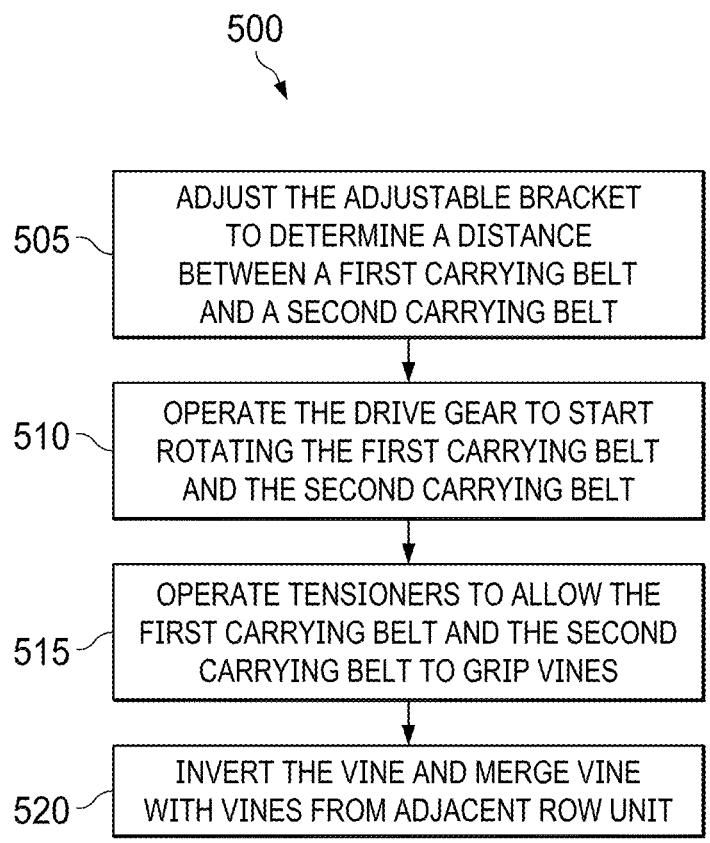
FIGS. 5a, 5b, 5c and 5d illustrate exemplary methods of operating the digger-shaker-inverter assembly according to embodiments of the present disclosure.

FIG. 5a illustrates an exemplary method 500 of operating the DSI assembly 100 assembly according to embodiments of the present disclosure. For example, the method may be performed by a DSI assembly 100 illustrated in FIG. 1.

In operation 505, the adjustable bracket 225 is adjusted to determine a distance between a first carrying belt 250 and a second carrying belt 265. The distance is determined based on an average size of a vine to be harvested. The adjustable bracket is rotated to distance the second carrying belt 265 from the first carrying belt 250.

In operation 510, the drive gear 110 is operated to start rotating the first carrying belt 250 and the second carrying belt 265. The drive gear 110 rotates a drive shaft 115 that disperse the rotating force or torque amongst a plurality of first and second clutch sprockets 240 and 255. The first clutch sprockets 240 match with first horizontal sprockets 245 and the second clutch sprockets 255 match with the second horizontal sprockets 260 to translate a rotation about a horizontal axis to rotation about a vertical axis. The first clutch sprockets 240 and the second clutch sprockets 255 are positioned on the drive shaft 115 to provide opposite rotation to the first horizontal sprocket 245 and second horizontal sprocket 260. In other words, the first clutch sprockets 240 and the second clutch sprockets 255 are positioned to cause the first carrying belt 250 and the second carrying belt 265 to rotate in opposite directions in order for parts of each belt 250 and 265 on the inside of the row unit 200 to rotate in the same direction.

In operation 515, the tensioners 235 are operated to allow the first carrying belt 250 and the second carrying belt 265 to grip the vines. When a vine is conveyed past a point on the belt where a tensioner is located, a spring 275 of the tensioner is compresses and then expands.

In operation 520, the fingers 270 invert the vine and merge the vine with vines from an adjacent row unit.

Figure 5B:
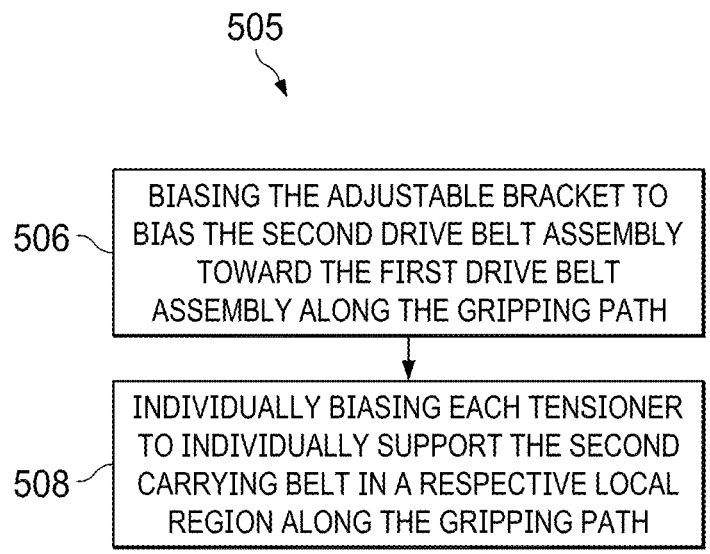

Referring now to FIG. 5b, in another embodiment, the operation 505 of adjusting the adjustable bracket 225 to determine a distance between the first carrying belt 250 and the second carrying belt 265 along the gripping path 322 further comprises operation 506, namely, biasing the adjustable bracket to bias the second belt drive assembly 215 toward the first belt drive assembly 210 along the gripping path, and operation 508, namely, individually biasing each tensioner 235 to individually support the second carrying belt in a respective local region 340 along the gripping path.

Figure 5C:
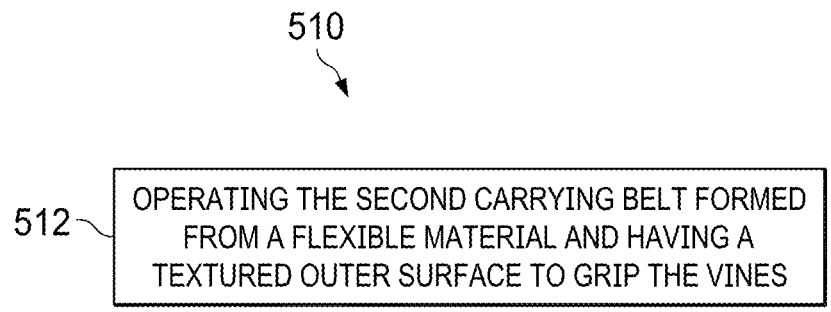

Referring now to FIG. 5c, in another embodiment, the operation 510 of adjusting operating the drive gear to start rotating the first carrying belt 250 and the second carrying belt 265 further comprises operation 512, namely, operating the second carrying belt 265 formed from a flexible material and having a textured outer surface to grip the vines 310, 320.

Figure 5D:
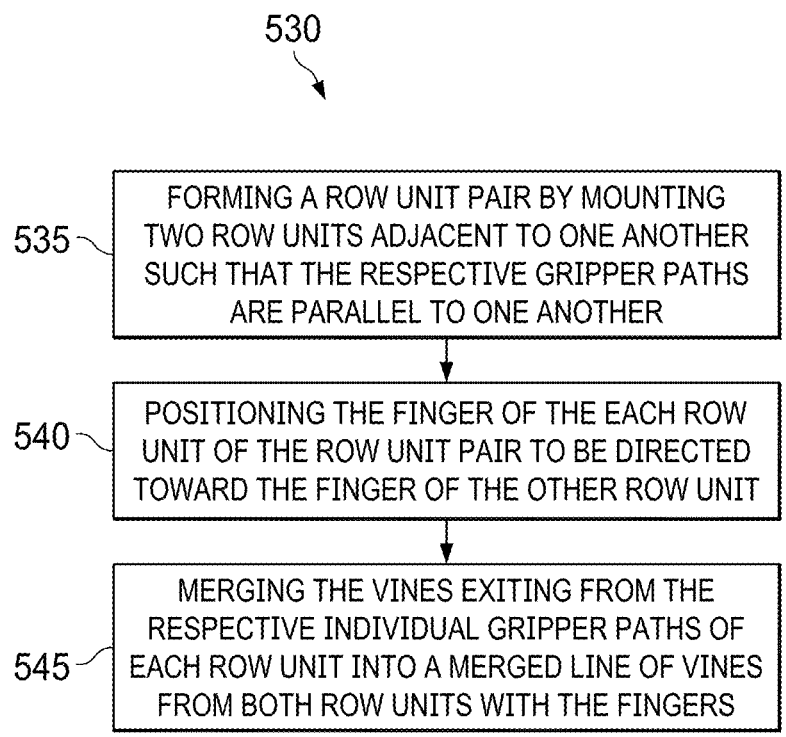

Referring now to FIG. 5d, there is illustrates another exemplary method 530 of operating the DSI assembly 100 assembly according to embodiments of the present disclosure. For example, the method may be performed by a DSI assembly 100 illustrated in FIG. 1.

In operation 535, a row unit pair 130 is formed by mounting two row units 200 (or one row unit 120 and one row unit 125) adjacent to one another such that the respective gripper paths 322 are parallel to one another.

In operation 540, the finger 270 of the each row unit of the row unit pair is positioned to be directed toward the finger of the other row unit. In other words, the fingers 270 of the respective row units point generally toward one another.

In operation 545, the vines exiting from the respective individual gripper paths of each row unit are merged into a merged line of vines from both row units with the fingers.

Although FIGS. 5a-5d illustrate examples of processes for operating a DSI assembly 100 assembly, various changes could be made to FIGS. 5a-5d. For example, while shown as a series of operations, various operations in each figure could overlap, occur in parallel, occur in a different order, or occur multiple times.

Figure 6A:
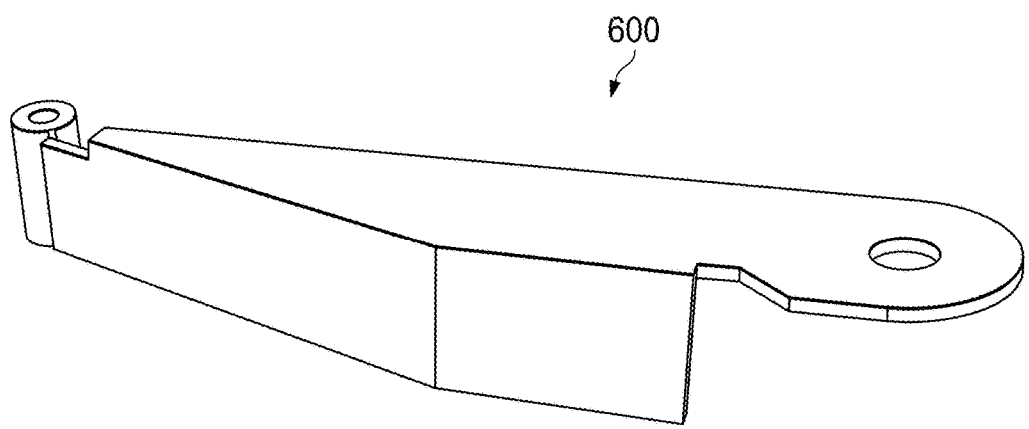
FIGS. 6a, 6b, 6c and 6d illustrate an exemplary belt adjustable bracket and sub-assemblies of the frame for the digger-shaker-inverter according to embodiments of the present disclosure.

FIG. 6a illustrates an exemplary bracket 600 for the DSI assembly 100 according to embodiments of the present disclosure. For example, the bracket 600 may be used as the link 237 for the tensioners 235. The embodiment of the adjustable bracket 600 illustrated in FIG. 6a is for illustration only. FIG. 6a does not limit the scope of this disclosure to any particular embodiment of a DSI assembly 100.

Figure 6B:
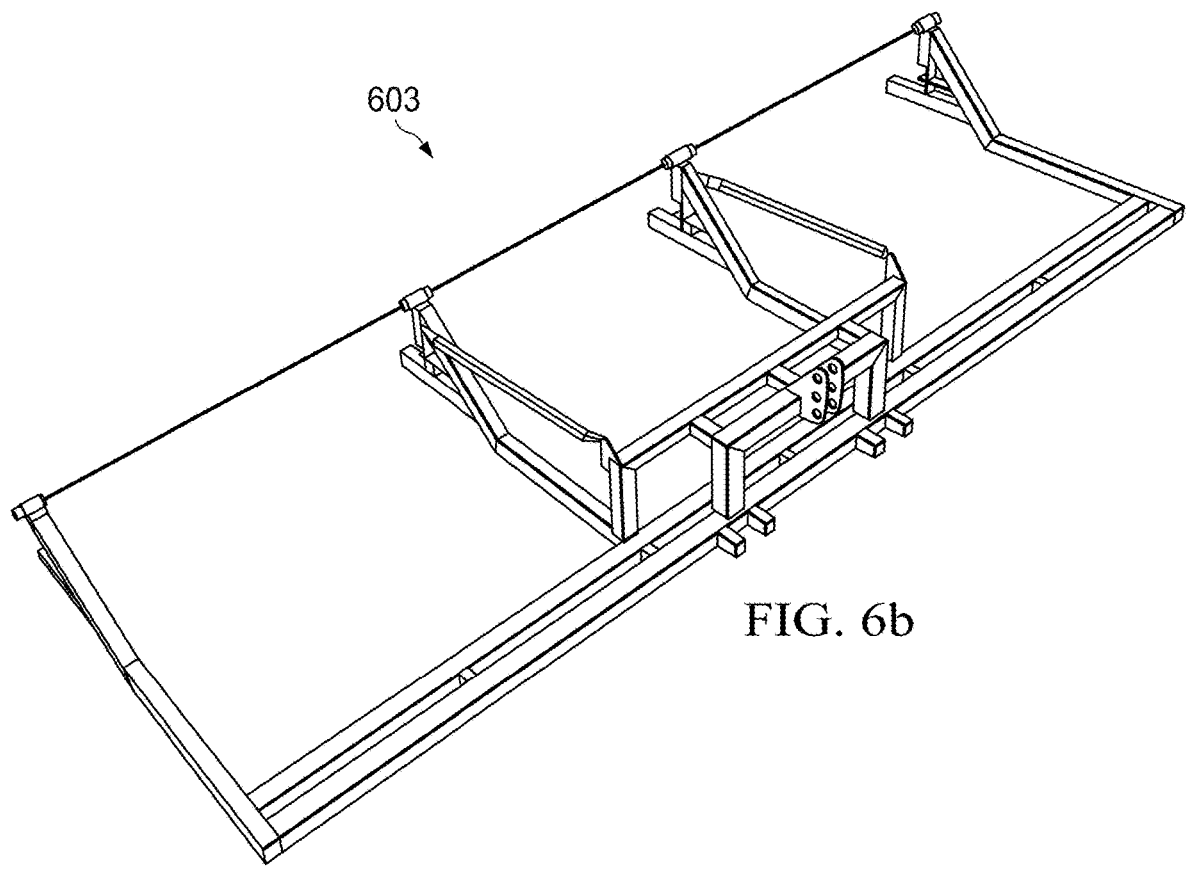
Figure 6C:
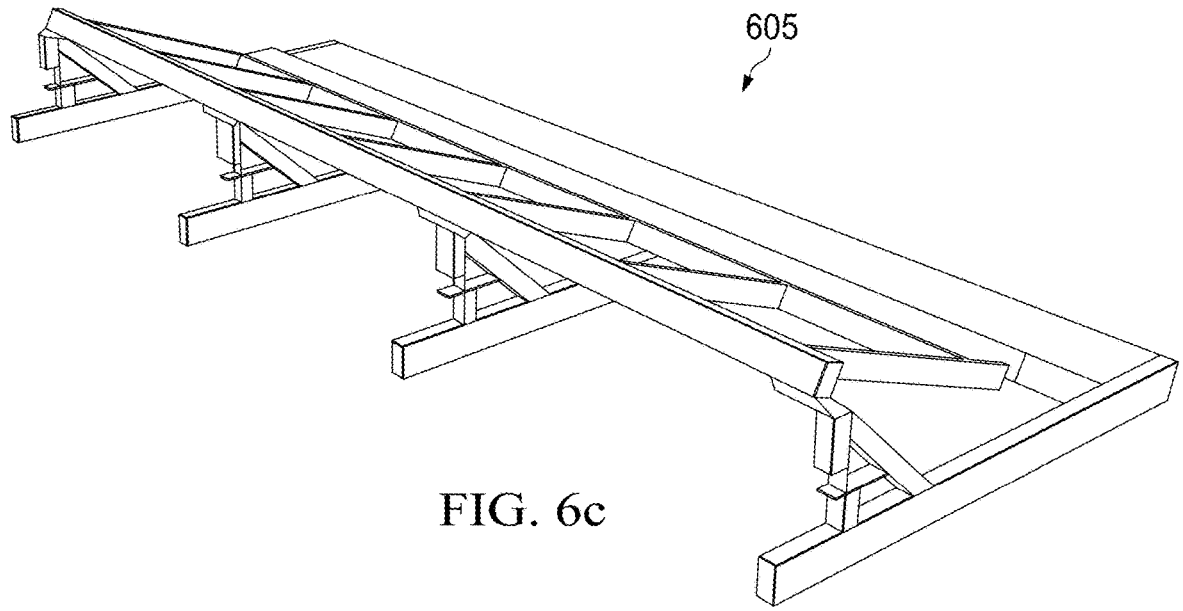
Figure 6D:
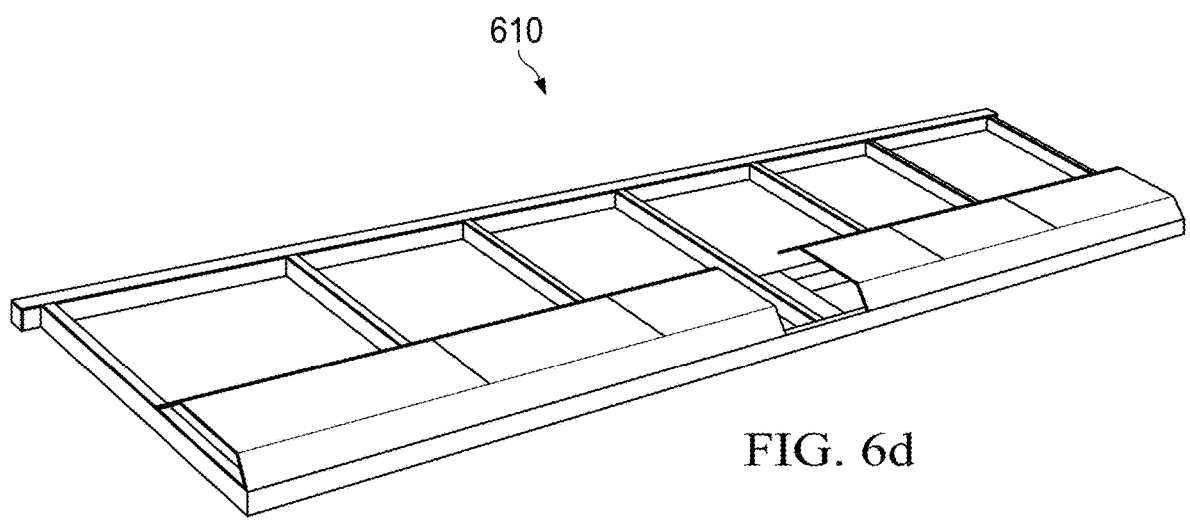

FIGS. 6b, 6c, and 6d illustrate frame sub-assemblies 603, 605, and 610 of the frame according to embodiments of the present disclosure. The embodiments of the frame sub-assembly 603 illustrated in FIG. 6b, frame sub-assembly 605 illustrated in FIG. 6c, and the frame sub-assembly 610 illustrated in FIG. 6d are for illustration only. FIGS. 6b, 6c, and 6d do not limit the scope of this disclosure to any particular embodiment of a DSI.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A row unit for a digger-shaker-inverter assembly, the row unit comprising:
   a first belt drive assembly supported by a row frame, the first belt drive assembly comprising:
      a first carrying belt configured to grip a first side of a vine, and
      a fixed bracket having a first length and fixedly mounted to the row frame, the fixed bracket having a plurality of idlers mounted thereon, the idlers configured to support the first carrying belt; and
   a second belt drive assembly supported by the row frame, the second belt drive assembly comprising:
      a second carrying belt configured to grip a second side of the vine,
      an adjustable bracket having a second length greater than the first length and adjustably mounted to the row frame, the adjustable bracket having a plurality of rollers mounted thereon, the rollers configured to support the second carrying belt, and
      springs mounted to the adjustable bracket and each connected to one of the rollers; and
   a curved finger mounted to the adjustable bracket and extending across a path of a vine exiting from a region between the first carrying belt and the second carrying belt, the curved finger configured to invert the exiting vine,
   wherein adjustment of a position of the adjustable bracket relative to the fixed bracket, at least in part, a maximum distance between a portion of the first carrying belt and a corresponding portion of the second carrying belt,
   wherein the springs mounted to the adjustable bracket are configured to control, at least in part, the maximum distance between the portion of the first carrying belt and the corresponding portion of the second carrying belt,
   wherein the springs control a minimum distance between the portion of the first carrying belt and the portion of the second carrying belt, and
   wherein the minimum distance is less than a thickness of a thinnest vine to be harvested and the maximum distance is controlled to be less than or equal to a thickness of a thickest vine to be harvested.

2. The row unit of claim 1, wherein the adjustable bracket is fixed from adjusting during operation to set the minimum distance, and wherein the springs are each configured to bias the portion of the second carrying belt toward the portion of the first carrying belt and allow movement of the portion of the second carrying belt within a range of distances from the portion of the first carrying belt corresponding to
   the minimum distance at a maximum extension of a respective spring, and
   the maximum distance at a maximum compression of the respective spring.

3. The row unit of claim 1, wherein the plurality of idlers mounted on the first belt drive assembly are in fixed positions on the fixed bracket and wherein each idler is configured to put tension on the first carrying belt, and
   wherein the plurality of rollers mounted on the second belt drive assembly are movable on the adjustable bracket and wherein tensioners are configured to cause the rollers to put tension on the second carrying belt using the springs to grip vines of different thicknesses between the first carrying belt and the second carrying belt.

4. The row unit of claim 3, wherein the tensioners are evenly spaced,
   wherein the first and second carrying belts are configured to pull gripped vines from the ground,
   wherein the first carrying belt is driven using a first vertical gear and a first horizontal gear, and
   wherein the second carrying belt is driven using a second vertical gear and a second horizontal gear.

5. The row unit of claim 3, wherein the plurality of idlers and the plurality of rollers are evenly spaced in an alternative arrangement.

6. The row unit of claim 3, wherein the second carrying belt is made of a flexible material.

7. The row unit of claim 6, wherein each of the tensioners are configured to independently support and bias a local region of the second carry belt.

8. A digger-shaker-inverter (DSI) assembly, comprising:
a row frame; and
a plurality of row units attached to the row frame, each row unit comprising:
a first belt drive assembly supported by the row frame, the first belt drive assembly comprising:
a first carrying belt configured to grip a first side of a vine, and
a fixed bracket having a first length and fixedly mounted to the row frame,
the fixed bracket having a plurality of idlers mounted thereon, the idlers configured to support the first carrying belt; and
a second belt drive assembly supported by the row frame and having a second length greater than the first length, the second belt drive assembly comprising:
a second carrying belt configured to grip a second side of the vine,
an adjustable bracket adjustably mounted to the row frame, the adjustable bracket having a plurality of rollers mounted thereon, the rollers configured to support the second carrying belt,
springs mounted to the adjustable bracket and each connected to one of the rollers, and
a curved finger mounted to the adjustable bracket and extending across a path of a vine exiting from a region between the first carrying belt and the second carrying belt, the curved finger configured to invert the exiting vine,
wherein adjustment of a position of the adjustable bracket, at least in part, a maximum distance between a portion of the first carrying belt and a corresponding portion of the second carrying belt,
wherein the springs mounted to the adjustable bracket are configured to control, at least in part, the maximum distance between the portion of the first carrying belt and the corresponding portion of the second carrying belt,
wherein the springs control a minimum distance between the portion of the first carrying belt and the portion of the second carrying belt, and
wherein the minimum distance is less than a thickness of a thinnest vine to be harvested and the maximum distance is controlled to be less than or equal to a thickness of a thickest vine to be harvested.

9. The DSI assembly of claim 8, wherein the adjustable bracket is fixed from adjusting during operation to set the minimum distance, and wherein the springs are each configured to bias the portion of the second carrying belt toward the portion of the first carrying belt and allow movement of the portion of the second carrying belt within a range of distances from the portion of the first carrying belt corresponding to
the minimum distance at a maximum extension of a respective spring, and
the maximum distance at a maximum compression of the respective spring.

10. The DSI assembly of claim 8, wherein the plurality of idlers mounted on the first belt drive assembly are in fixed positions on the fixed bracket and wherein each idler is configured to put tension on the first carrying belt, and
wherein the plurality of rollers mounted on the second belt drive assembly are movable on the adjustable bracket and wherein tensioners are configured to cause the rollers to put tension on the second carrying belt using the springs to grip vines of different thicknesses between the first carrying belt and the second carrying belt.

11. The DSI assembly of claim 10, wherein the tensioners are evenly spaced,
wherein the first and second carrying belts are configured to pull gripped vines from the ground,
wherein the first carrying belt is driven using a first vertical gear and a first horizontal gear, and
wherein the second carrying belt is driven using a second vertical gear and a second horizontal gear.

12. The DSI assembly of claim 10, wherein the plurality of idlers and the plurality of rollers are evenly spaced in an alternative arrangement.

13. The DSI assembly of claim 10, wherein the second carrying belt is made of a flexible material.

14. The DSI assembly of claim 13, wherein each of the tensioners are configured to independently support and bias a local region of the second carry belt.

15. A method for a digger-shaker-inverter assembly, comprising:
fixing a position of a fixed bracket for a first belt drive assembly relative to a row frame, the fixed bracket having a plurality of idlers mounted thereon, the idlers configured to support a first carrying belt;
adjusting a position, relative to the row frame, of an adjustable bracket of a second belt drive assembly to control, at least in part, a maximum distance between a portion of the first carrying belt on the first belt drive assembly and a corresponding portion of a second carrying belt on the second belt drive assembly, wherein springs mounted to the adjustable bracket are each connected to one of a plurality of rollers mounted to the adjustable bracket;
gripping a vine on a first side using the first carrying belt supported by idlers mounted on a fixed bracket on the first belt drive assembly;
gripping the vine on a second side using the second carrying belt supported by the rollers mounted to the adjustable bracket; and
inverting a vine exiting from a region between the first carrying belt and the second carrying belt with a curved finger mounted to the adjustable bracket and extending across a path of the exiting vine,
wherein the springs control a minimum distance between the portion of the first carrying belt and the corresponding portion of the second carrying belt, wherein the minimum distance is less than a thickness of a thinnest vine to be harvested and the maximum distance is controlled to be less than or equal to a thickness of a thickest vine to be harvested.

16. The method of claim 15, further comprising:
fixing the adjustable bracket from adjusting during operation to set the minimum distance,
wherein the springs are each configured to bias the portion of the second carrying belt toward the portion of the first carrying belt and allow movement of the portion of the second carrying belt within a range of distances from the portion of the first carrying belt corresponding to the minimum distance at a maximum extension of a respective spring, and the maximum distance at a maximum compression of the respective spring.

17. The method of claim 15, further comprising:

putting tension, using the idlers provided on the fixed bracket of the first belt drive assembly, on the first carrying belt; and putting tension, using the rollers and a plurality of tensioners provided on the adjustable bracket of the second belt drive assembly, on the second carrying belt, wherein each of the tensioners uses the springs to provide the tension to grip vines of different thicknesses between the first carrying belt and the second carrying belt.

18. The method of claim 17, wherein the plurality of tensioners are evenly spaced, wherein the first and second carrying belts are configured to pull gripped vines from the ground, wherein the first carrying belt is driven using a first vertical gear and a first horizontal gear, and wherein the second carrying belt is driven using a second vertical gear and a second horizontal gear.

19. The method of claim 17, wherein the idlers and the rollers are evenly spaced in an alternative arrangement.

20. The method of claim 17, further comprising independently biasing, using each of the plurality of tensioners, a local region of the second carrying belt, wherein the second carrying belt is made of a flexible material.

\* \* \* \* \*